(12) United States Patent
Green (10) Patent No.: US 10,470,953 B1
(45) Date of Patent: Nov. 12, 2019

(54) ANTI-ROLLBACK WHEELCHAIR DEVICE (71) Applicant: Stephen Green, West Fork, AR (US)

(72) Inventor: Stephen Green, West Fork, AR (US)

( * ) Notice: Subject to any disclaimer, the term of this patent is extended or adjusted under 35 U.S.C. 154(b) by 0 days.

(21) Appl. No.: 15/906,293

(22) Filed: Feb. 27, 2018

(51) Int. Cl.
*A61G 5/02* (2006.01)
*A61G 5/10* (2006.01)
*F16D 43/204* (2006.01)
*F16D 41/06* (2006.01)

(52) U.S. Cl.
CPC ........... *A61G 5/101* (2013.01); *A61G 5/1016* (2013.01); *A61G 5/1035* (2013.01); *F16D 41/06* (2013.01); *F16D 43/204* (2013.01)

(58) Field of Classification Search
CPC .... A61G 5/101; A61G 5/1016; A61G 5/1035; A61G 5/1086; F16D 41/06; F16D 43/204
See application file for complete search history.

(56) References Cited

U.S. PATENT DOCUMENTS

| | | | | |
|---|---|---|---|---|
| 4,045,047 A * | 8/1977 | Buckley | ............... | A61G 5/1027 188/82.2 |
| 4,462,605 A * | 7/1984 | Morgan | ................... | A61G 5/10 180/10 |
| 4,538,825 A * | 9/1985 | Delahoussaye | .......... | A61G 5/10 188/82.3 |
| 4,733,755 A * | 3/1988 | Manning | .................. | A61G 5/10 188/2 F |
| 4,887,830 A * | 12/1989 | Fought | ................. | A61G 5/1018 280/304.1 |
| 5,486,016 A * | 1/1996 | Godin | ...................... | A61G 5/02 280/236 |
| 5,746,437 A * | 5/1998 | Faber | ....................... | A61G 5/02 280/250.1 |
| 5,765,669 A * | 6/1998 | Adams | .................. | B25B 13/462 192/43 |
| 6,203,041 B1 * | 3/2001 | Helm | ....................... | A61G 5/10 192/41 A |
| 6,210,300 B1 * | 4/2001 | Costin | ...................... | F16H 3/66 475/292 |
| 6,253,880 B1 * | 7/2001 | Faber | ................... | A61G 5/1018 188/2 F |
| 6,341,671 B1 * | 1/2002 | Ebersole | .............. | A61G 5/1024 188/2 F |
| 6,464,044 B2 * | 10/2002 | Suganuma | ........... | A61G 5/1018 188/2 F |
| 6,598,724 B1 * | 7/2003 | Stedman | ................ | A61G 5/101 188/2 F |

(Continued)

*Primary Examiner* — Anne Marie M Boehler (57) ABSTRACT

A wheelchair anti-rollback device utilizes one-way roller clutches which incorporate a selectable free-rotation functionality such that the wheelchair user can select between anti-rollback and free-wheeling modes. The anti-rollback mode is of utility when the wheelchair user is propelling up ramps. The modal selection is by means of a knob positioned on the centerline rotation axis of the mechanism. The mechanism also included functionality that allows mode change from anti-rollback to free-wheeling to be made at any time, including while the chair is on an inclined ramp. The invention can incorporated into the hub of the rear wheels of a wheelchair or into the toggle mechanism of typically used to actuate parking brakes. When incorporated into a wheelchair, the invention gives the wheelchair user greater control and ease in ascending ramps.

14 Claims, 12 Drawing Sheets

(56) References Cited

U.S. PATENT DOCUMENTS

| | | | | |
|---|---|---|---|---|
| 6,655,503 B1 * | 12/2003 | Moody | ............... | A61G 5/10 188/2 F |
| 6,688,437 B2 * | 2/2004 | Usherovich | ............ | A61G 5/10 188/2 F |
| 6,739,610 B2 * | 5/2004 | Connors | ............... | A61G 5/14 188/5 |
| 6,916,032 B2 * | 7/2005 | Wong | ............... | A61G 5/023 280/242.1 |
| 6,953,412 B2 * | 10/2005 | Braford | ............... | F16H 3/66 192/3.52 |
| 7,316,298 B2 * | 1/2008 | Yeager | ............... | A61G 5/10 188/17 |
| 8,381,883 B2 * | 2/2013 | Lo | ............... | F16D 49/00 188/2 F |
| 2013/0033092 A1 * | 2/2013 | Wu | ............... | A61G 5/1027 301/6.1 |

* cited by examiner

ANTI-ROLLBACK WHEELCHAIR DEVICE

BACKGROUND OF THE INVENTION

The need for a mechanism that will restrain a wheelchair from rolling backwards has been recognized as long as wheelchairs have been constructed. One of the uses for such a device is to prevent a user's wheelchair from rolling backward away from them as they sit down in the wheelchair, or as they stand up. These are often called anti-rollback devices. Another need arises from the challenges in ascending inclines and ramps with a manual drive wheelchair. In this instance the manual wheelchair user (MWU) must provide the propelling force to overcome the gravitational load. In common practice the MWU uses pushrims to rotate the rear wheel a fraction of a revolution, typically about 30 to 45 degrees. At the end of the push stroke the user must maintain a force through the pushrims to keep the chair from rolling backward. If another push stroke is required while on the incline, the MWU must let go of the pushrims, move their hands to a new placement on the pushrims, and re-grip the pushrims quickly enough that the wheelchair does not roll backward such that the previous incremental upward progress is lost. For many MWU's this push-and-grab procedure is difficult or impossible to accomplish. This has led to the development of various devices, often called "hill holders". These hill holders have some sort of means of holding the wheelchair in position against the force of gravity while the MWU repositions their hands and is ready to push again. The hill holder style of device is distinguished from the anti-rollback devices by a more robust construction that can hold the weight of wheelchair and MWU against the force of gravity while on a ramp or incline.

PRIOR ART

Examples of anti-rollback devices for the purpose of restraining rearward movement of a wheelchair during sitting down and getting up include the "wheelchair anti-rollback device" at ReliableMedSupplies.com. It is exemplary of a family of devices that uses some sort of metal rod with a hook formed to engage the wheelchair tire by friction in such way that rearward rotation is prevented. Some of this type device are automatically engaged until disengaged by the weight of the MWU. Other designs for anti-rollback and hill holder devices are implemented by an adaptation of the common parking brake lever as shown in U.S. Pat. No. 4,887,830. This device utilizes a rear wheel engaging cam like component that wedges against the wheel to prevent rearward rotation, but disengages to allow forward rotation. In this way the convenient placement of the parking brake lever is utilized to actuate the hill holder function.

All of these wheels share certain shortcomings when performing the hill holding function. First among these is the inability to propel rearward to control what is commonly called a "wheelie". Wheelies, that is the lifting of the front casters wheels from contact with the floor by applying forward propelling torque to the pushrims are useful for MWU's. They allow the front casters to be jumped over obstructions and changes in level of the floor. A commonly shared attribute of the current state of the art in hill holders prevents the rearward rotation which is needed to prevent overturning backward once a wheelie has been initiated. The tendency to lift the front casters from the floor is greatly exacerbated when the wheelchair is on an incline which moves the center of gravity of the wheelchair and MWU toward the rear. This is a serious safety issue. Another ubiquitous shortcoming is the inability to change modes from hill holding mode to free-wheeling mode while on an incline. In effect, the load on the mechanism that holds the wheelchair and MWU on the incline jams the components so that they cannot be disengaged, or changed in mode to free wheeling. The operational effect of this on the MWU is that they cannot change direction easily while on an incline. If the MWU has any challenges to strength or coordination, common among MWU's, this is a serious problem.

Some hill holders are implemented by use of a toggle lever mechanism commonly used for simple parking brakes. Movement of the lever in one direction engages the hill holder device and in the opposite direction disengages it. While this does allow changing from hill holding mode to freewheeling mode on a ramp, it is unsafe for the MWU to do so, as their hands will have been removed from the pushrims to grasp the levers. While the MWU's hands are off of the pushrims, they do not have control of the wheelchair position or movement. Consequently, moving the toggle mechanism lever to disengage the hill holder results in the chair rolling backwards on the incline in an uncontrolled manner until the MWU can re-grasp the pushrims to control the wheelchair. As many MWU's have impaired strength and coordination, this situation is unacceptably dangerous.

The MagicWheels two-speed geared wheels include clutches in their hypocycloidal drive which do not allow the wheels to roll backward when the low speed mode is being used. They also can be over-ridden by extra force being applied rearward on the pushrim. The major disadvantages of the units are their heavy weight and high cost. Additionally they cannot be shifted from hill holding mode to freewheeling while on an incline.

U.S. Pat. No. 6,655,503 discloses a roller with an off center rotation axis mounted to a common parking brake style toggle lever such that movement of the lever forces the roller into contact with the wheelchair tire. In combination with a pin the device limits rearward rotation of the wheelchair tire. U.S. Pat. No. 6,203,041 disclosed an anti-rollback hill holder mechanism incorporated into the hub portion of the rear wheelchair wheel. Like other inventions, these devices do not allow rearward propulsion for control of wheelies, and they cannot be shifted from anti-rollback to freewheeling while the wheelchair is on an incline.

Various roller clutch mechanisms are known to the art, but fail to adequately address wheelchair anti-rollback needs. U.S. Pat. No. 6,210,300 presents a roller clutch invention that uses formed cam surfaces on the inside diameter portion of the outer member of the clutch, with the rollers biased by individual springs. This type of clutch is complex and problematically expensive to manufacture in small quantities for wheelchair applications.

U.S. Pat. No. 6,953,412 discloses a reversible one-way clutch which incorporates cammed surfaces on either the outer periphery of an inner race, or the inner periphery of an outer race, in combination with cylindrical rollers, a cage portion containing said rollers and biasing springs for each roller, and a biasing plate 96 which functions to move the bias springs such that the clutch functions in either forward or reverse. It also, like other similar one-way reversible clutches, depends on a plurality of individual springs, 114, generally either one or two per roller, to achieve torque transmission in a selectable direction of rotation. Due to the dependence on individual springs for roller biasing, the arrangement thus taught is limited to a bi-state operation, as the springs will push the rollers either one direction on the other, and are not intended or able to achieve an intermediate position. Therefore, either CW torque transmission with freewheeling CCW is achieved, or CCW torque transmission with freewheeling CW, thus lacking a neutral position allowing freewheeling both CW and CCW. This lack of a free-wheeling functionality makes this mechanism unacceptable for a wheelchair anti-rollback application. Unique to this arrangement is the further incorporation of a biasing plate 96 to effect movement of the plurality of springs from one torque transmission state to the reverse. This arrangement as presented is of greater complexity and cost than is needed for wheelchair transmissions.

U.S. Pat. No. 5,765,669 teaches a reversible clutch type mechanism with features similar to U.S. Pat. Nos. 6,953,412 and 6,210,300 in that it incorporates rollers that can be positioned such that torque transmission in selected direction can be achieved. It also use a complex formed spring cage to position the rollers with respect to the cam surfaces.

BRIEF SUMMARY OF THE INVENTION

The present invention furthers the state of the art by providing an anti-rollback mechanism for manual wheelchairs that allows both free-wheeling and anti-rollback modes, with the ability to shift between modes at any time, including while the wheelchair is on a ramp. Additionally, the invention incorporates an overload clutch mechanism that allows the manual wheelchair user (MWU) to propel the wheelchair backward, even while the mechanism is engaged in anti-rollback mode. The invention can be incorporated into the rear wheel hubs such that the appearance of the wheelchair is unchanged, an important aesthetic consideration for many MWU's. It can also be attached to a typical wheelchair parking brake lever, while retaining full functionality. The parking brake lever embodiment is attractive for those cases where the MWU prefers to keep the rear wheels of the wheelchair unchanged, and but still wants the advantages of the anti-rollback device.

OBJECTS OF THE INVENTION

It is therefore an object of this invention to provide a wheelchair anti-rollback mechanism that addresses the shortcomings in the state of the art mentioned above.

A further object of this invention is to provide an anti-rollback mechanism that can selectively prevent a manual wheelchair from rolling backwards and also allow freewheeling in both directions.

A further object of this invention is to provide a method by which the anti-rollback mechanism can be shifted from an anti-rollback mode to a freewheeling mode.

A further object of this invention is to provide a mechanism that can be shifted between modes while in anti-rollback mode with the wheelchair on an incline.

A further object of this invention is to provide an anti-rollback mechanism that includes an overload clutch that allows the MWU to propel the wheelchair backwards even while the mechanism is in anti-rollback mode.

A further object of this invention is to provide a anti-rollback mechanism that can be incorporated into wheel hubs as well as a typical parking brake lever.

A further object of this invention is to provide anti-rollback mechanism that can be incorporated into a typical parking brake lever arrangement while retaining the parking brake function.

BRIEF DESCRIPTION OF SEVERAL VIEWS OF THE INVENTION

DETAILED DESCRIPTION OF THE INVENTION

Figure 1:
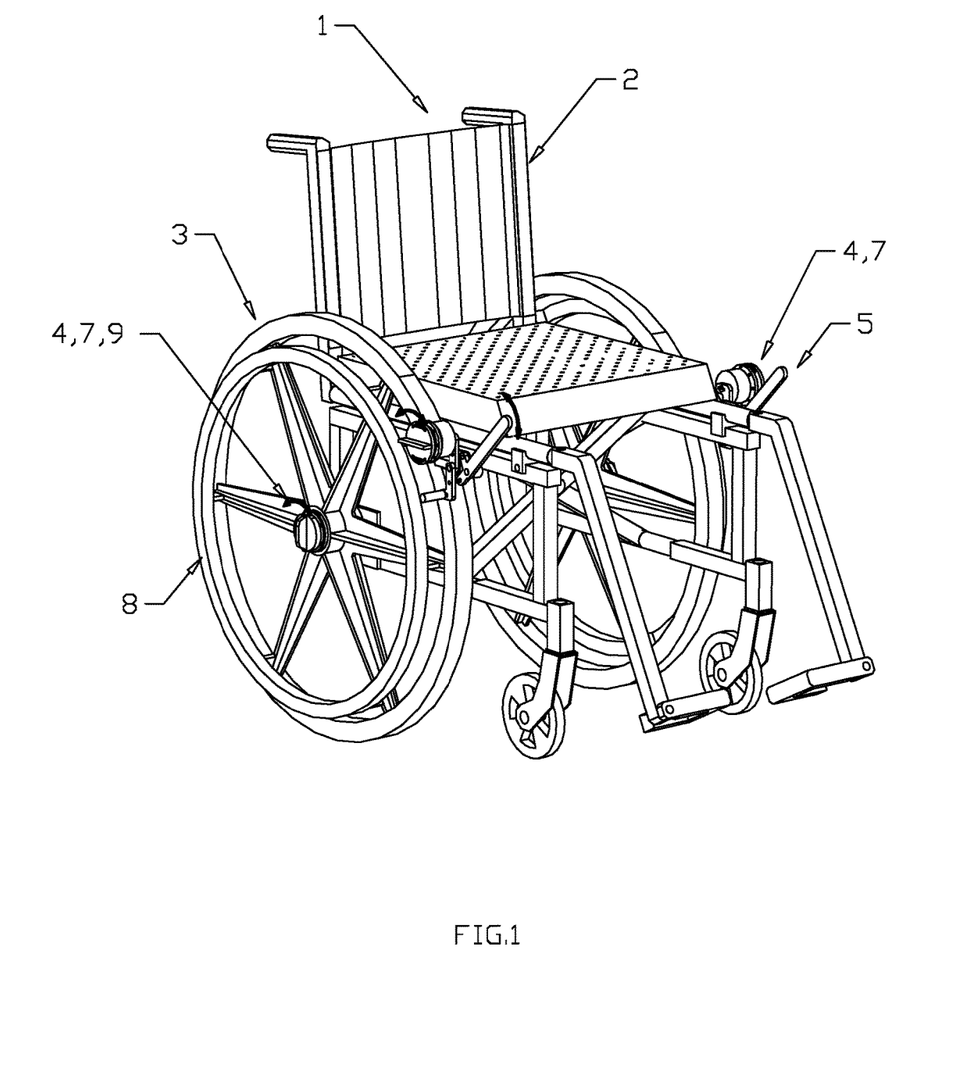
FIG. 1 is a perspective view of a typical manual wheelchair with both wheel hub and lever mount embodiments of the invention installed.
Figure 2:
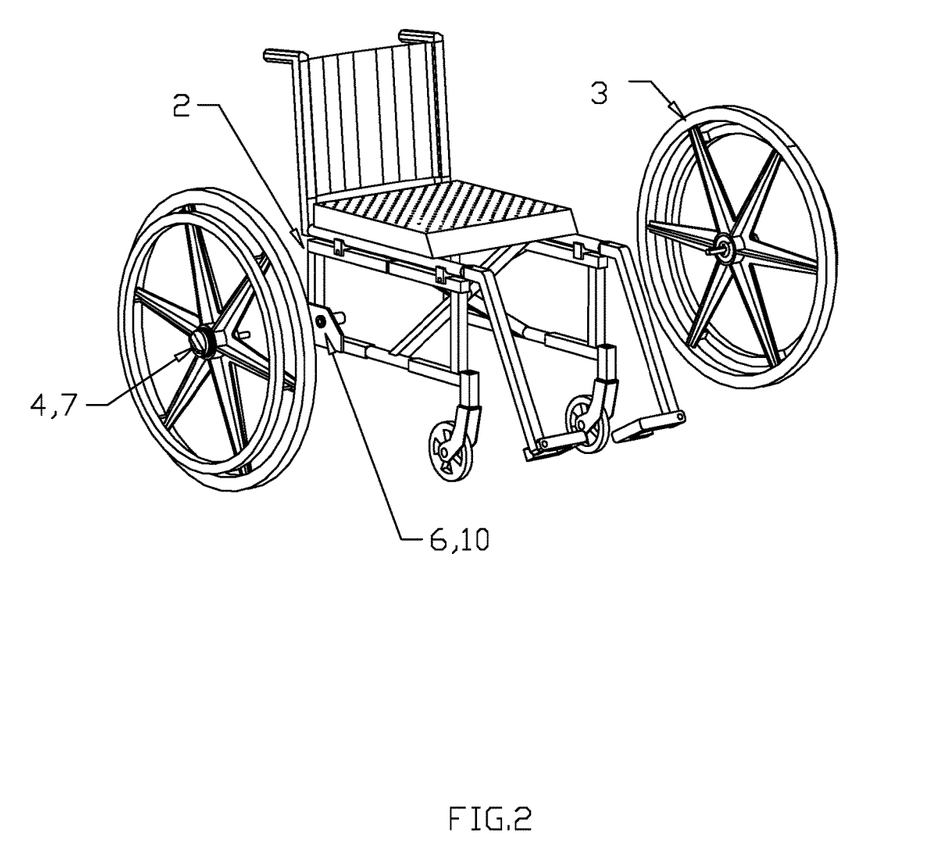
FIG. 2 shows a partially exploded view of a manual wheelchair with wheel hub embodiments of the invention installed.
Figure 3:
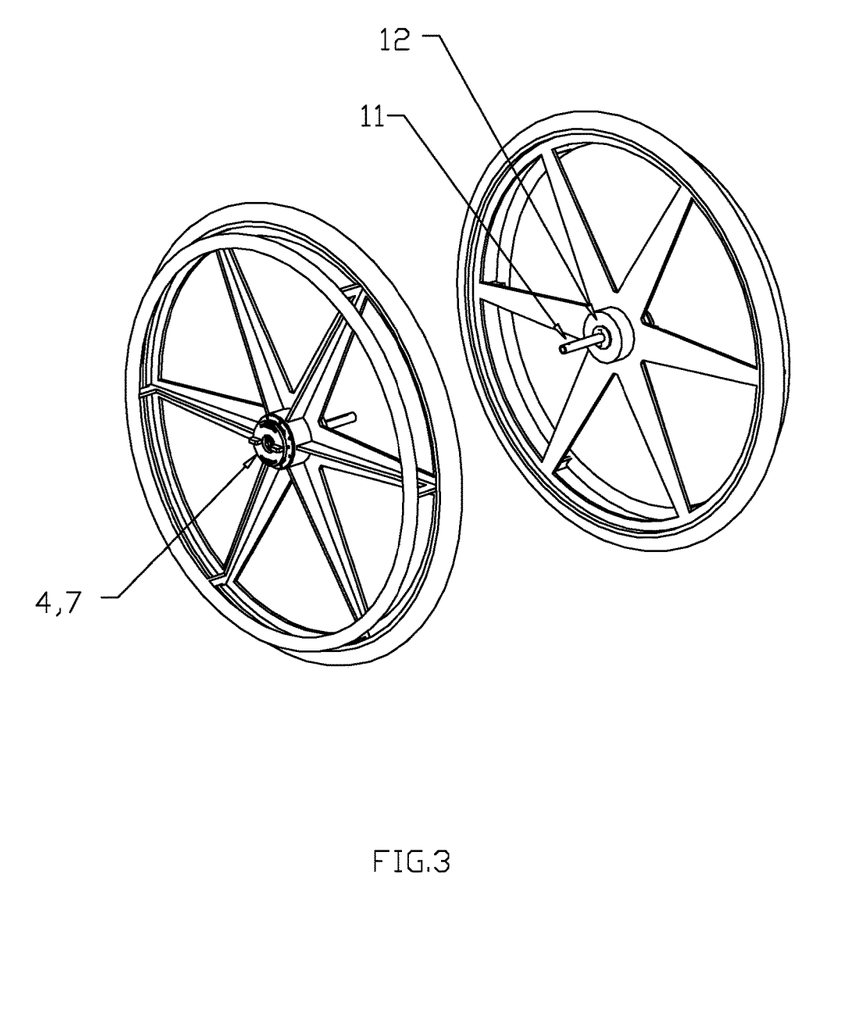
FIG. 3 is a view of the wheel hub embodiment, showing inside and outside features.
Figure 4:
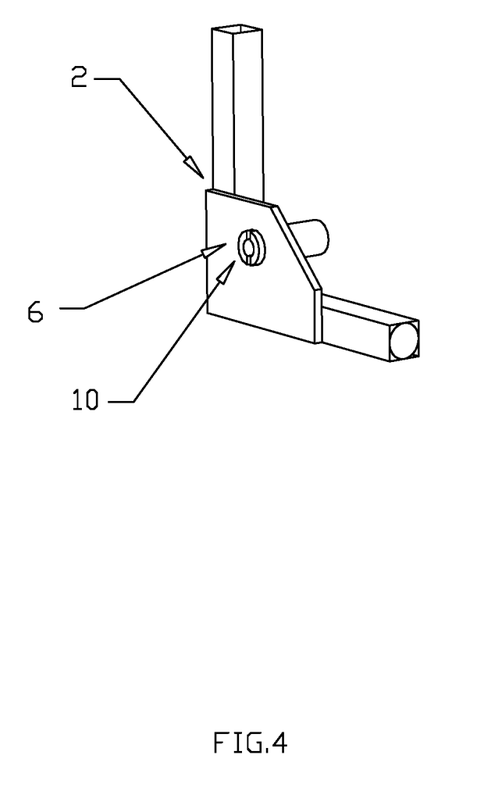
FIG. 4 is a close up view of the right rear corner of the wheelchair frame illustrating the wheel hub spindle socket.
Figure 5:
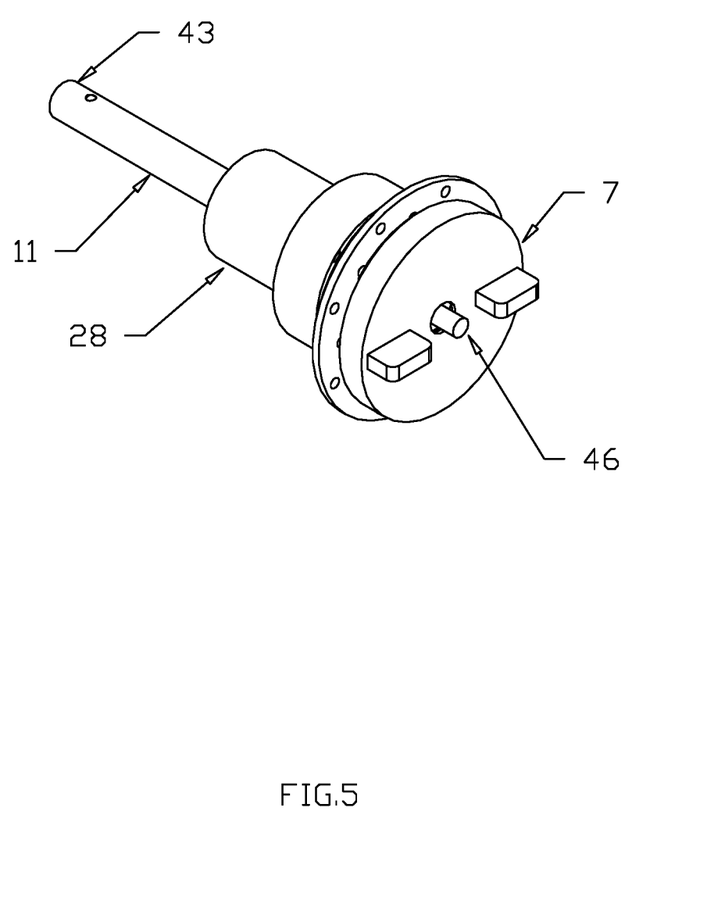
FIG. 5 is a perspective view of the complete anti-rollback hub assembly removed from the wheel.

With reference to FIG. 1, a typical manual wheelchair 1 is shown with two of the preferred embodiments of the wheelchair anti-rollback device invention installed on a typical manual wheelchair frame 2. Although both embodiments are shown on a single wheelchair in the interest of brevity and clarity, a typical installation would include only one embodiment. Either embodiment of this invention will provide the functionality of two modes of operation, free-wheeling and anti-rollback. Rear wheels 3 with typical fixed pushrims 8 are shown in place on wheelchair frame 2. Mode selector knob 7 can be seen with knob rotation arrow 9 showing the knob rotation required to change modes. Obscured by knob 7 is the anti-rollback hub 4. Hub spindle socket 6 with torque reaction slot 10 is shown in FIGS. 2 and 4. Spindle shaft 11 with spindle shaft torque reaction pin 12 is shown in FIG. 3. The embodiment of this invention as appropriate to mount in a wheelchair wheel is shown in FIG. 5 along with mode selector knob 7 and hub spindle shaft 11.

Figure 6:
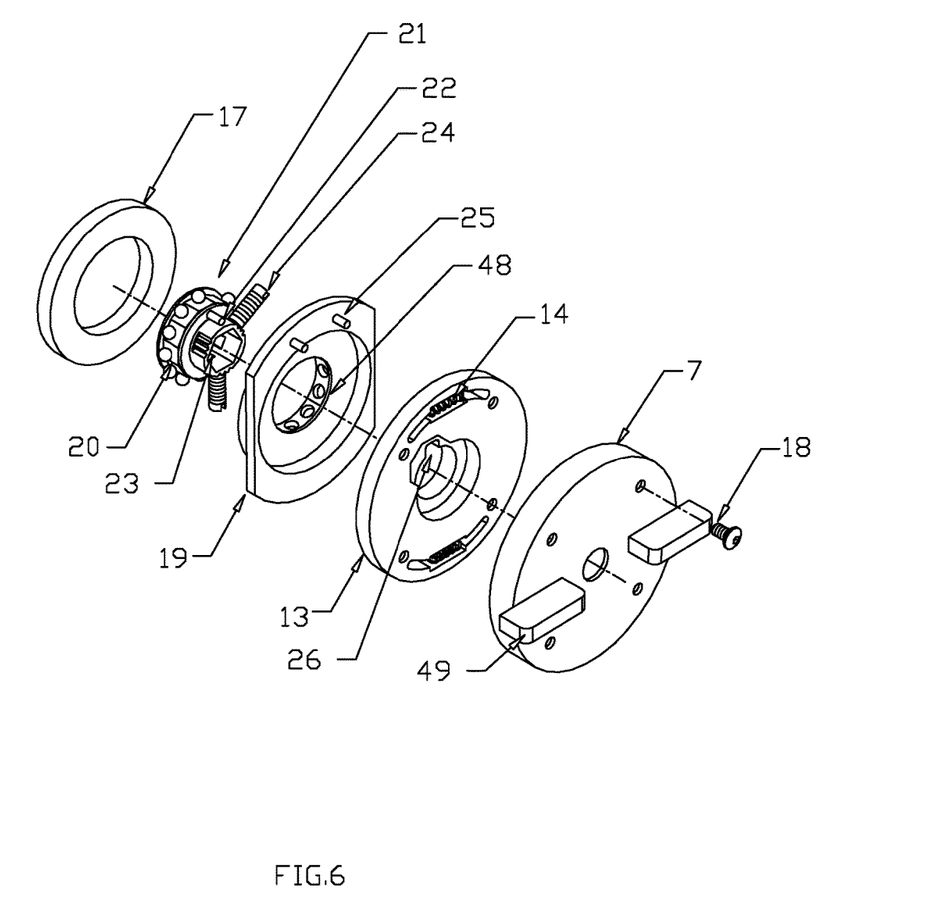
FIG. 6 is partial exploded view of the anti-rollback hub assembly illustrating the one-way clutch and mode shift compensator components.

In the exploded partial view of the anti-rollback hub shown in FIG. 6, operator 13 is shown with the associated mode select compensator springs 14 installed in mating notches with mode select knob 7 and associated screw 18 removed. When assembled, knob 7 is fixed to operator 13 by one or more screws 18. Just behind operator 13 is the one way roller clutch cage 19 which incorporates holes 48 for the associated spherical balls 20. Also incorporated into cage 19 are compensator spring engaging pins 25. When assembled these pins 25 are in contact with either end of compensator spring 14. The action of pins 25 in concert with springs 14 is to allow a controlled amount of relative rotation between operator 13 and cage 19. Clutch balls 20 are shown in situ with each ball approximately in the center of its associated facet of polygonal clutch cam 21. Clutch cam 21 also incorporates three sets of detent notches 23, shown in juxtaposition with their associated spring plunger assemblies 24, which in operation would be held by mating tapped holes in cage 19. It may be understood that spring plunger assemblies are a generically well known mechanical element incorporating a spring urged plunger, often with a rounded work contacting portion, housed in a threaded body for convenience in application. The action of spring plungers 24 in concert with their associated detent notches 23 is to hold clutch cage 19 in either of two positions. One position is the free-wheeling mode position that is shown in FIG. 6. The other position is attained when the MWU rotates knob 7 and with it operator 13 such that springs 14 rotate clutch cage 19 by pushing against pins 25. In this instance, cage 19 rotates until spring plungers 24 move from detent notch 23 associated with free-wheeling mode to the other notch 23 associated with anti-rollback mode. In this position compensator springs 14 again rotate clutch 19 by pushing against pins 25, but in the opposite direction. Also incorporated into clutch cam 20 is stop pin 22. When assembled, stop pin 22 engages stop pin notch 26 in operator 13, in such way as to limit the rotation of operator 13.

Taken together, the mechanical elements described comprise a one-way rotation mechanism capable of selectively allowing free wheel rotation or preventing wheel rotation in one direction. A further functionality of the described mechanism allows selection of either free wheel rotation or prevention of wheel rotation in one direction while said one-way rotation mechanism has a torque load imposed on it.

It should be understood that the one-way ball roller clutch mechanism is just one type of one-way clutch or ratchet mechanism that will function with this invention. Cylindrical rollers can be substituted for the ball rollers without affecting the intention of this disclosure. Similarly, other one-way rotary mechanisms such as sprag clutches and ratchet mechanisms can be used with the novel elements described in this invention disclosure.

Figure 7:
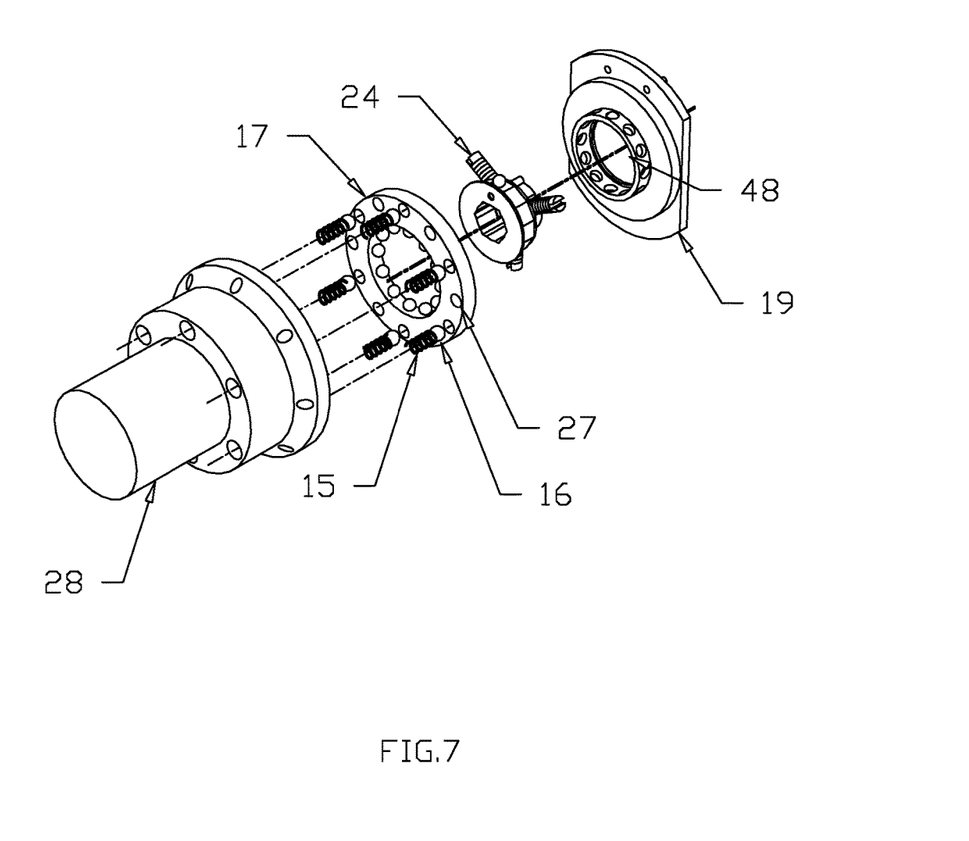
FIG. 7 is another partial exploded view of the anti-rollback hub illustrating the torque override clutch components.

In FIG. 7, springs 15 and associated spherical balls 16 of the torque override clutch mechanism are shown slightly removed from engaging spherical depressions 27 in clutch race 17. When assembled into hub housing 28, balls 16 urged by springs 15, act to rotationally fix race 17 with respect to hub housing 28, and cause it to withstand an adjustable amount of maximum torque. When this maximum torque is exceeded, rotational movement of race 17 results, causing spherical depressions 27 to urge the balls against associated springs 15. The override clutch action described allows the MWU to propel the chair backward at any time, even while the anti-rollback mode is engaged.

Figure 8:
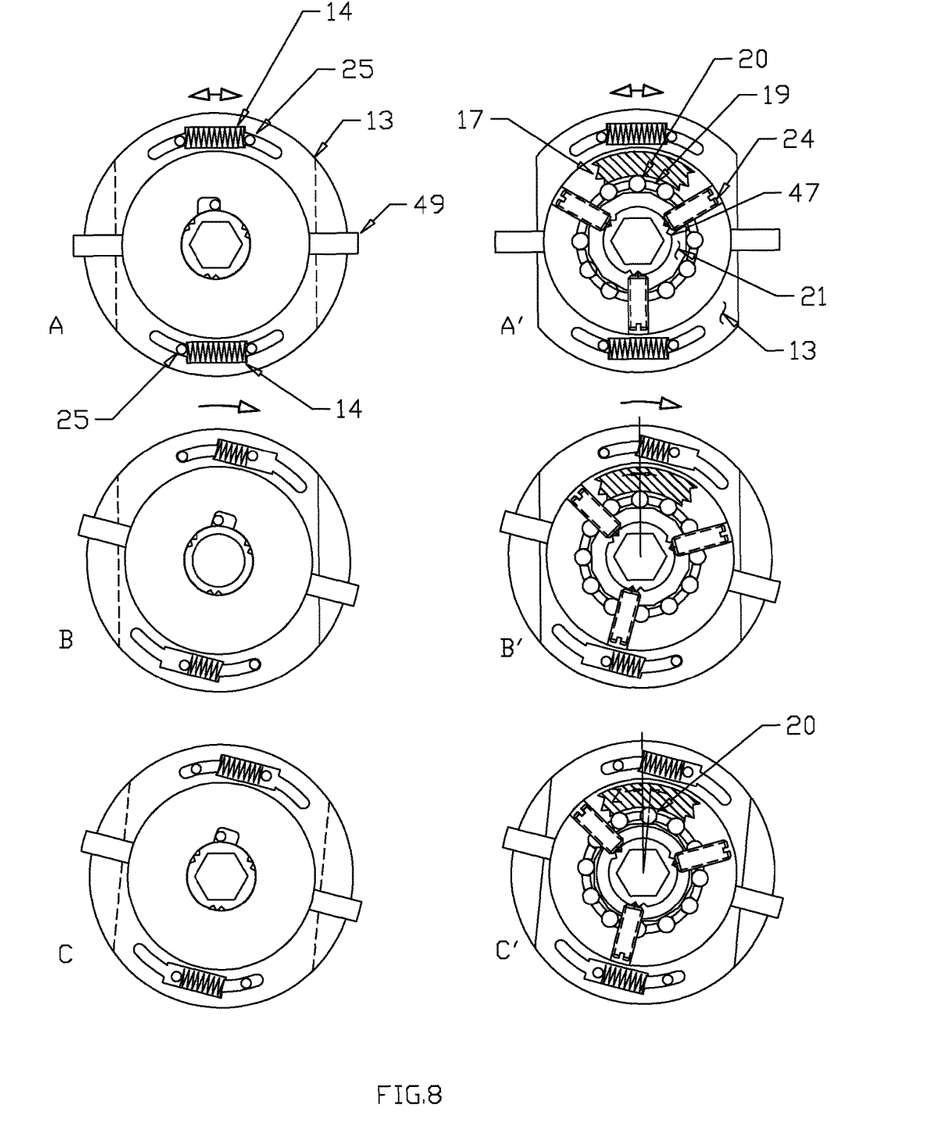
FIG. 8 shows views of the anti-rollback hub to illustrate the function of mode shift compensator mechanism.

FIG. 8 shows sequential views of a mode shift from free-wheeling to anti-rollback mode. Depicted are selected components of the invention to illustrate the pertinent aspects of the operational sequence of the mode shift compensator mechanism. In views 8A, 8B, and 8C, the central round portion of knob 7 has been removed, with only knob wings 49 remaining, to show details of operator 13. In views 8A', 8B', and 8C', the central portion of operator 13 has also been removed to show clutch cam 21, clutch balls 20, race 17, detent notches 23, and spring plungers 24 in the operational positions. In all views in FIG. 8, mode select compensator springs 14 and their associated compensator spring pins 25 are shown. Views A and A' show the mechanism in free-wheeling mode. View B and B' illustrate the relative position of components when the MWU has moved knob 7 and associated operator 13 to accomplish a mode change from free-wheeling to anti-rollback mode. However, in views B and B' clutch cage 19 has not yet moved, although compensator springs 14 are exerting force upon it. In view C and C', clutch cage 19, with associated balls 20, responsive to the force imposed by springs 14, has moved into position such that the anti-rollback functionality is in effect. View C' shows balls 20 moved slightly clockwise such that a slight relative motion between race 17 and clutch cam 21 will result in a wedging action of balls 20 between race 17 and cam 21. The juxtaposition of cam 21 with balls 20 and associated race 17 is also shown in FIG. 6. It may be understood that a change from anti-rollback mode to free-wheeling mode involves the reverse of the sequence just described and depicted in FIG. 8.

Figure 9:
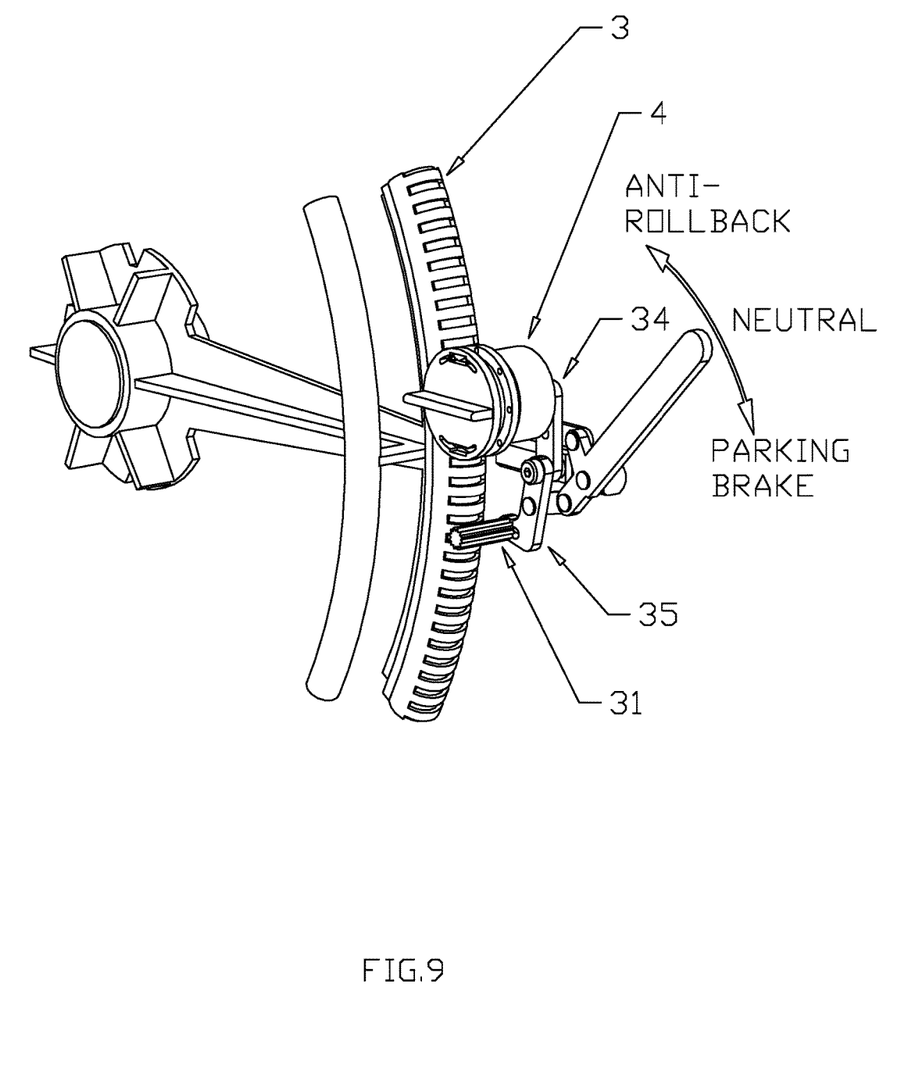
FIG. 9 illustrates a double toggle lever mounted embodiment of the invention with both anti-rollback hub assembly and a parking brake post in perspective.
Figure 10:
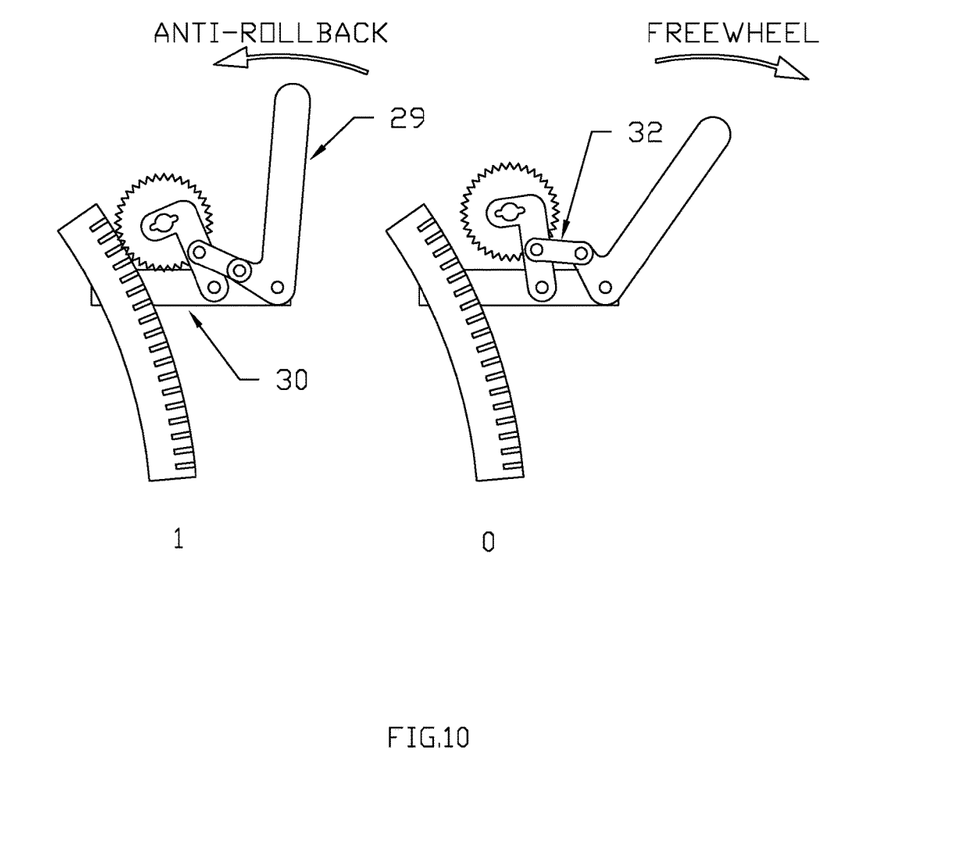
FIG. 10 is a plan view of a single toggle lever embodiment of the invention in juxtaposition with a segment of the associated wheel illustrating the engagement modes.
Figure 11:
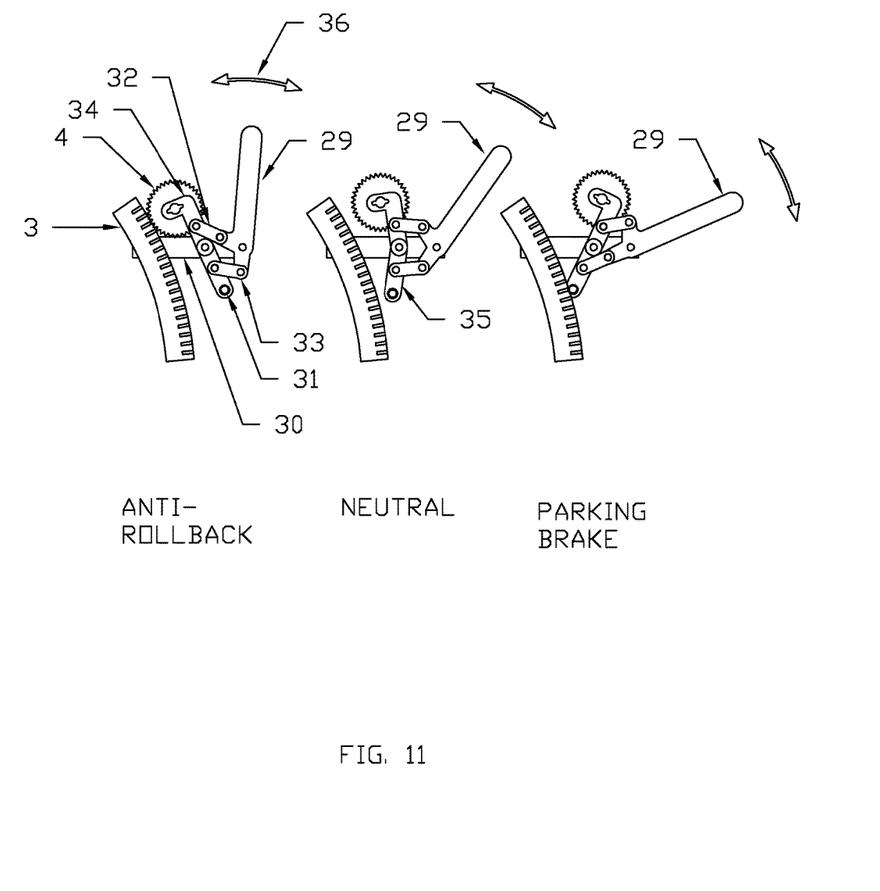
FIG. 11 is a plan view of a double toggle lever embodiment of the invention with both anti-rollback hub and parking brake post in juxtaposition with a segment of the associated wheel illustrating the engagement modes.

FIG. 9 depicts a double toggle lever embodiment of the invention. It may be understood that the components of anti-rollback hub 4, as depicted in FIGS. 5, 6, and 7, are also contained in the anti-rollback hub 4, as depicted in FIG. 9, in which anti-rollback hub 4 is shown rotatably fixed to hub mount link 34 of the toggle lever assembly. FIGS. 9, 10, and 11 serve also to illustrate the single and double toggle lever mechanisms that engage and disengage the anti-rollback hub 4 from operational contact with rear wheel 3. In FIGS. 9, 10, and 11 the toggle mechanism includes a hand engaging toggle lever 29, and a toggle assembly mounting bar 30. In FIGS. 9 and 11, a double toggle mechanism serves to selectively engage parking brake post 31 as well as anti-rollback hub 4. Toggle links 32 and 33 are rotationally fixed to engaging portions of toggle lever 29 and also to anti-rollback hub mount 34 and parking brake post mount 35 respectively. FIG. 11 depicts the engagement sequence in three modes, anti-rollback, neutral, and parking brake. In FIG. 11—neutral, neither the anti-rollback hub 4 nor the parking brake post 31 are engaged with rear wheel 3. In FIG. 11—anti-rollback, it may be seen that movement of toggle lever 29 as shown by arrow 36 has urged the anti-rollback hub 4 into contact with rear wheel 3. In FIG. 11—parking brake, movement of toggle lever 29 has moved anti-rollback hub 4 away from rear wheel 3 while parking brake post 31 has been moved into engagement with wheel 3.

Figure 12A:
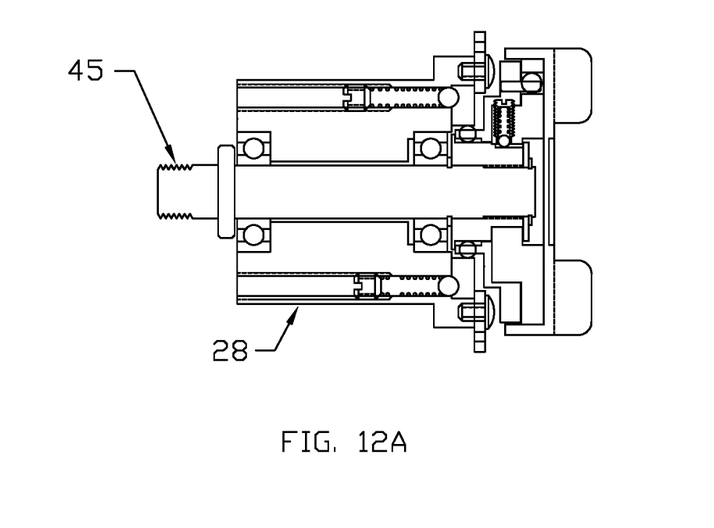
FIGS. 12A and 12B are sectioned views of the parking lever and wheel hub embodiments of the invention respectively.
Figure 12B:
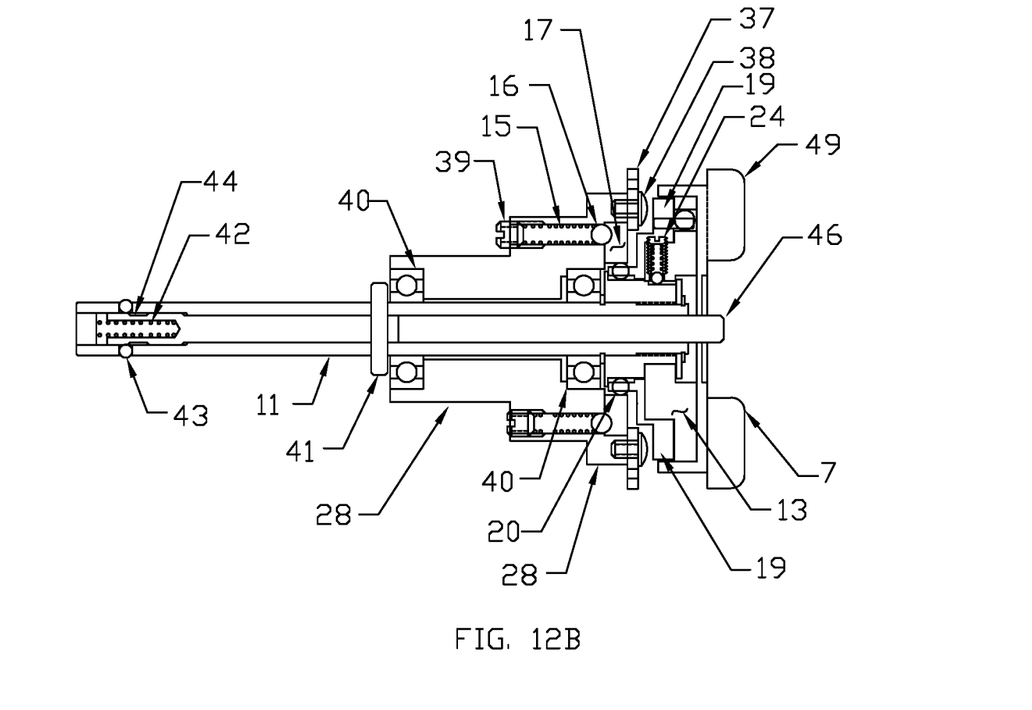

FIGS. 12A and 12B are cross-sectional views of two embodiments of anti-rollback hub 4. FIG. 12A is a cross-section view of the toggle lever embodiment, also shown in FIGS. 9, 10, and 11. FIG. 12B is a cross-section view of the wheel hub embodiment, also shown in FIGS. 5 and 6. The two embodiments share many internal components, and bring the same mechanical functionality to their respective mounting conditions. With reference to FIG. 12B, spindle detent pushrod 46 is centrally located in spindle shaft 11. As shown, detent balls 43 are held slightly protruding beyond the diameter of spindle shaft 11 by an endmost full diameter portion of detent pushrod 46. Contiguous to the endmost full diameter portion is a detent in cam 44 formed by a reduced diameter portion of pushrod 46. It may be seen that axial movement of pushrod 46 serves to selectively urged balls 43 radially outward, or allow them to move inward toward the center. Spindle detent spring 42 acts upon pushrod 46. It may be seen that when pushrod 46 is the position shown in FIG. 12B, detent balls 43 are caused to project beyond the outer diameter of spindle shaft 11, and tend to remain there as a consequence of the axial force exerted by spring 42. When spindle shaft 11 is installed in the mating hole of hub spindle socket 6, shown in FIG. 4, projecting balls 43 act to axially secure spindle shaft 11 to hub spindle socket 6. A force exerted on pushrod 46 in opposition to spring 42 will act to allow balls 43 to move radially inward, thus releasing shaft 11 from socket 6. Relative rotation between spindle 11 and socket 6 is restrained by the mechanical interaction of torque reaction pin 41, FIG. 12B, with torque reaction slot 10 portion of socket 6, shown in FIG. 4.

With reference to FIGS. 6, 7, 8, and 12, operator detent spring plungers 24 act upon detent notches 23 in clutch cam 21 in such manner that operator 13 is rotationally fixed by detent spring plunger force with respect to cam 21, itself fixed to spindle shaft 11. Clutch cam race 17 is axially fixed in its operation position by clutch race clamp 37. Override clutch balls 16 and associated springs 15, also shown in FIGS. 7 and 12, are axially captured in hub housing 28 by adjustment screws 39, which also serve to adjust the axial force exerted by springs 15 on balls 16.

The description of components and operation above in reference to the wheel mountable embodiment of this invention, apply also to the toggle lever embodiment shown in FIG. 12A. The primary difference between the two embodiments is the elimination of the spindle detent features, 42, 43, and 44, and the addition of spindle threaded portion 45.

What is claimed is:

1. A mechanism for selectively allowing or preventing a wheelchair from rolling backwards comprising:
    a wheel;
    a pushrim fixed to said wheel;
    a spindle shaft;
    a spindle shaft socket;
    a housing;
    a one-way rotation mechanism interposed between said spindle shaft and said wheel capable of selectively allowing free wheel rotation or preventing wheel rotation in one direction;
    a mode selector knob to allow selection of free wheel rotation or preventing wheel rotation in one direction
    a mechanism responsive to the action of said mode selector knob which allows selection of either free wheel rotation or prevention of wheel rotation in one direction while said one-way rotation mechanism has a torque load imposed upon it;
    an overload clutch mechanism interposed functionally between said one-way rotation mechanism and said wheel allowing an adjustable level of input torque applied to said pushrim to cause rotation of said wheel while said one-way rotation mechanism is selectively preventing rotation.

2. The mechanism of claim 1 wherein said spindle shaft can removably fit within said spindle shaft socket and when assembled together does not allow relative rotation.

3. The mechanism of claim 1 wherein said one-way rotation mechanism comprises a cam and roller clutch.

4. The mechanism of claim 3 wherein said cam and roller clutch comprises a cam, a race, a rotationally moveable roller cage, and associated rollers.

5. The mechanism of claim 1 wherein said mechanism which allows selection of free wheel rotation or prevention of wheel rotation while said one-way rotation mechanism has a torque load imposed upon it comprises a spring movement compensator, whereby the mode selector knob acts upon said one-way rotation mechanism through said spring movement compensator.

6. The mechanism of claim 4 wherein a spring movement compensator comprises an operator with springs operatively connecting it to said rotationally moveable roller cage.

7. The mechanism of claim 4 wherein said cam incorporates means of selectively fixing said rotationally moveable roller cage in such positions as to allow one-way rotation or free wheel rotation.

8. The mechanism of claim 7 wherein said means of selectively fixing said rotationally moveable roller cage in such positions as to allow one-way rotation or free wheel rotation comprises spring urged balls acting upon a grooved portion of said cam.

9. The mechanism of claim 4 wherein said overload clutch mechanism comprises balls contained within said housing, said balls having one axis of movement and being urged into mating depressions in said race by adjustable springs.

10. A mechanism for selectively allowing or preventing a wheelchair rolling backwards comprising:
    a spindle shaft;
    a wheel contacting roller;
    a one-way rotation mechanism interposed between said spindle shaft and said roller capable of selectively allowing free roller rotation or preventing rotation in one direction;
    a mode selector knob to allow selection of free wheel rotation or preventing wheel rotation in one direction
    a mechanism responsive to the action of said mode selector knob which allows selection of either free wheel rotation or prevention of wheel rotation in one direction while said one-way rotation mechanism has a torque load imposed upon it;
    an overload clutch mechanism interposed functionally between said one-way rotation mechanism and said roller allowing an adjustable level of input torque transmitted to said roller to cause rotation of said roller while said one-way rotation mechanism is selectively preventing rotation
    a lever mechanism connecting said wheel contacting roller and a wheelchair;
    a mechanical interface to facilitate fixing said mechanism for selectively allowing or preventing a wheelchair rolling backwards to the wheelchair.

11. The mechanism of claim 10 wherein said lever mechanism comprises a toggle.

12. A mechanism for selectively allowing or preventing a wheelchair rolling backwards comprising:
    a spindle shaft;
    a wheel contacting roller;
    a one-way rotation mechanism interposed between said spindle shaft and said roller capable of selectively allowing free rotation or preventing rotation is one direction;
    a mode selector knob to allow selection of free wheel rotation or preventing wheel rotation in one direction
    a mechanism responsive to the action of said mode selector knob which allows selection of either free wheel rotation or prevention of wheel rotation in one direction while said one-way rotation mechanism has a torque load imposed upon it;
    an overload clutch mechanism interposed functionally between said one-way rotation mechanism and said roller allowing an adjustable level of input torque transmitted to said roller to cause rotation of said roller while said one-way rotation mechanism is selectively preventing rotation
    a lever mechanism to which said spindle shaft and a parking brake means are mounted;
    a mechanical interface to facilitate fixing said mechanism for allowing and preventing a wheelchair rolling backwards to a wheelchair.

13. The mechanism of claim 12 wherein said lever mechanism comprises a double toggle.

14. The mechanism of claim 12 wherein said parking brake means comprises a ridged cylinder fixed to said lever mechanism.

\* \* \* \* \*